United States Patent [19]

Buckley

[11] 4,309,095
[45] Jan. 5, 1982

[54] CAMERA MOUNTING DEVICE

[76] Inventor: Frederick P. Buckley, 62 Maple St., West Boylston, Mass. 01583

[21] Appl. No.: 203,720

[22] Filed: Nov. 3, 1980

[51] Int. Cl.³ ............................................. G03B 29/00
[52] U.S. Cl. ..................................................... 354/81
[58] Field of Search ..................... 354/80, 79, 81, 76, 354/293

[56] References Cited

U.S. PATENT DOCUMENTS

| | | | |
|---|---|---|---|
| 2,614,471 | 10/1952 | Markowitz | 354/293 |
| 2,664,797 | 1/1954 | Thrasher | 354/81 |
| 2,943,547 | 7/1960 | Martin | 354/293 |
| 3,427,103 | 2/1969 | McCain | 352/178 |
| 3,511,159 | 5/1970 | Hobbs, Jr. | 354/293 |
| 3,545,356 | 12/1970 | Nielsen | 354/79 |
| 3,602,123 | 8/1971 | Shinkle | 354/293 |
| 3,688,665 | 9/1972 | Herden | 354/79 |
| 3,709,124 | 1/1973 | Hunt | 354/79 |
| 3,785,261 | 1/1974 | Ganteaume | 354/76 |
| 3,877,048 | 4/1975 | Kellner | 354/82 X |
| 3,911,451 | 10/1975 | Vockenhuber | 354/79 |

Primary Examiner—Donald A. Griffin
Attorney, Agent, or Firm—Ronald G. Cummings

[57] ABSTRACT

A camera mounting device for mounting a camera to a hunting rifle is disclosed comprising a first mounting bracket adapted to support a camera, a threaded fastener to detachably secure a camera to the first mounting bracket, a variable diameter clamp to clamp the first mounting bracket to the barrel of the telescope sight of a rifle, a cable release for remote actuation of the camera, a second mounting bracket connected to the cable release, and threaded fasteners for detachably securing the second mounting bracket to the trigger guard of a rifle so that actuation of the cable release is coordinated to actuation of the rifle trigger.

10 Claims, 4 Drawing Figures

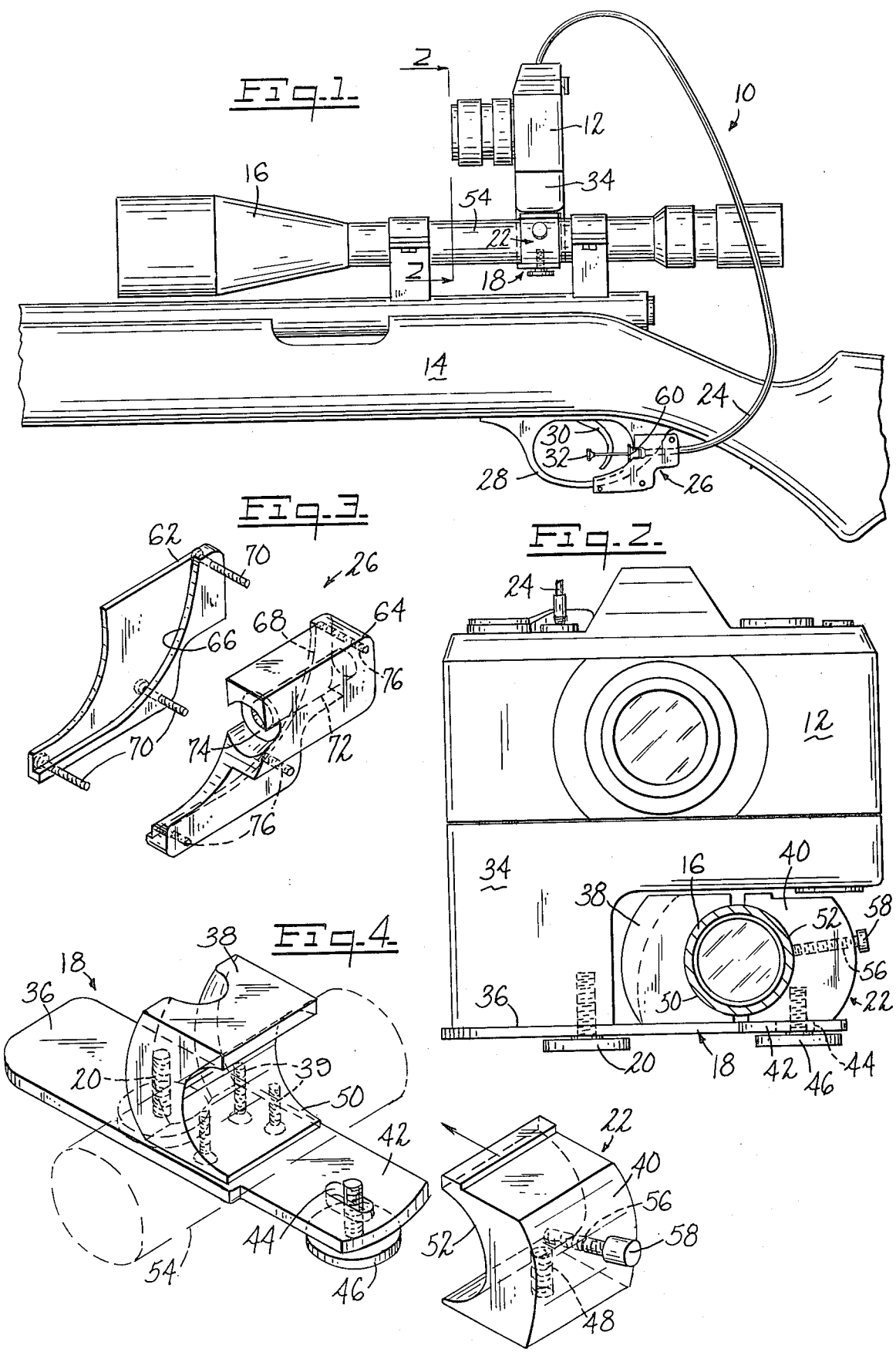

CAMERA MOUNTING DEVICE

BACKGROUND OF THE INVENTION

This invention relates to a camera mounting device, and more particularly to a mounting device for mounting a camera to the telescopic scope of a rifle for coordinated actuation of camera and rifle.

Prior camera mounting devices for attachment to a rifle required a specialized camera or a specialized telescopic scope and thus they were costly and limited in use to only hunting photography. Additionally, the prior art devices required permanent modifications to the rifle (or a specialized rifle) to accomplish coordination of rifle actuation and camera actuation. Permanent modification to an existing rifle decreases the market value of the rifle while specialized rifles are costly and often lack versatility.

SUMMARY OF THE INVENTION

A camera mounting device is disclosed comprising a first mounting bracket adapted to support a camera, a threaded fastener for detachably securing the camera to the first mounting bracket, a variable diameter clamp for detachably securing the first mounting bracket to the telescopic scope of a rifle, a cable release for connection to the camera, a second mounting bracket connected to the cable release, and threaded fasteners for detachably securing the second mounting bracket to the trigger guard of a rifle.

A conventional camera is secured to the first mounting bracket by a threaded fastener and the first mounting bracket is mounted to the telescopic scope of a rifle by a variable diameter clamp. The second mounting bracket is secured to the trigger guard and the cable release extends from the camera to the second mounting bracket for positioning adjacent the trigger of the rifle to coordinate actuation of the trigger and camera. The camera mounting device accomplishes detachable mounting of a conventional camera to a conventional rifle and telescopic scope for coordination or synchronization of camera photography to rifle trigger actuation.

It is a principle object of this invention to provide a camera mounting device for detachable securement of a camera to a rifle for coordinated actuation of camera and rifle.

A further object of the invention is to provide a camera mounting device that detachably secures to a conventional rifle without modification to the rifle.

A still further object of the invention is to provide a camera mounting device that is detachably securable to a wide variety of telescopic rifle scopes.

A still further object of the invention is to provide a camera mounting device that supports a wide variety of conventional cameras, and which is easily and quickly attached and detached from a rifle.

A still further object of the invention is to provide a camera mounting device that coordinates actuation of the camera with actuation of the rifle.

A still further object of the invention is to provide a camera mounting device for mounting a camera to a rifle that is economical to manufacture, durable in use, and refined in appearance.

BRIEF DESCRIPTION OF THE DRAWINGS

FIG. 1 is a partial side view of the invention mounted to a hunting rifle having a telescopic scope.

FIG. 2 is a sectional view seen on line 2—2 of FIG. 1;

FIG. 3 is an enlarged exploded perspective view of the cable release trigger mounting bracket;

FIG. 4 is an enlarged exploded view of the camera mounting bracket.

DESCRIPTION OF THE PREFERRED EMBODIMENT

The camera mounting device of this invention is generally designated by the numeral 10 and is shown in FIG. 1 mounting a conventional camera 12 to a conventional rifle 14 having a telescopic scope 16.

Camera mounting device 10 comprises a camera mounting bracket 18 to support camera 12 (FIGS. 2 and 4), threaded fastener 20 for detachable securement of camera 12 to mounting bracket 18, a scope clamping assembly 22 connected to mounting bracket 18 for detachable securement to scope 16, cable release cord 24 operationally connected to camera 12 for remote actuation thereof, and cable release mounting bracket 26 (FIG. 3) detachably secured to trigger guard 28 for support of cable release 24 to permit coordinated actuation of trigger 30 and button 32 of cable release 24.

For purposes of description, camera 12 is illustrated as a cartridge type conventional camera having an automatic winding motor 34 although it is understood that a wide variety of still and movie cameras may also be utilized.

Camera mounting bracket 18 has a supporting surface 36 for supportive engagement with the lower portion of winding motor 34. Threaded fastener 20 extends through mounting bracket 18 for engagement with a corresponding threaded bore (not shown) in motor 34 to detachably secure camera 12 to mounting bracket 18 in a conventional manner.

Clamp assembly 22 comprises first clamp element 38 securely attached to mounting bracket 18 by threaded fasteners 39, or the like. A second clamp element 40 slidably engages extension portion 42 of bracket 18 for adjustable spaced apart relation to first clamp element 38. Extension portion 42 has an elongated fastener receiving aperture 44 therethrough for slidable reception of threaded fastener 46. Second clamp element 40 has a correspondingly threaded bore 48 for engagement of fastener 46. Thus, second clamp element 40 can be securely fastened to bracket 18 in a selected spaced apart disposition to first clamp element 38. As can be seen from FIG. 4, first clamp element 38 has a concave recess 50 in face to face relationship to concave recess 52 of second clamp element 40. Concave recesses 50, 52 are intended to encompass and grip the barrel portion 54 of telescopic sight 16. Second clamp element 40 contains a threaded aperture 56 therethrough for receiving threaded stop pin 58 intended for retentive contact with barrel 54 to prevent angular rotation of camera 12 and mounting bracket 18 about scope 16 (FIG. 2). The adjustable variable position of clamp element 40 relative to clamp element 38 allows clamping assembly 22 to attach to various diameter telescopic scopes such that camera mounting device 10 can be used universally with most scopes. Any comparable means for attachment to the barrel portion 54 or scope 16 may be utilized.

Cable release cord 24 attaches to the shutter actuation mechanism (not shown) of camera 12 at one end and has an actuation button 32 at the other end for remote actuation of camera 12 by depressing button 32. A flange member 60 attached to cable release cord 24 facilitates the pressing or plunging action of button 32 to accomplish actuation. To coordinate the actuation of button 32 and trigger 30, cable release 24 and button 32 are mounted adjacent trigger 30 by means of cable release mounting bracket 26 (FIGS. 1 and 3).

Cable release mounting bracket 26 is comprised of plate element 62 and plate element 64. Plate elements 62 and 64 have concave recesses 66, 68 respectively to encompass trigger guard 28 upon the joinder of element 62 to element 64 by means of threaded fasteners 70. Plate element 64 contains a bore 72 therethrough to receive cable release cord 24. A seat portion 74 is located at one end of bore 72 to receive and abutt flange member 60 of cable release 24. The seat portion 74 thus retentively contains flange 60 to facilitate operation of actuation button 32.

In operation, camera 12 is securely attached to camera mounting bracket 18 by means of threaded fastener 20. Mounting bracket 18 is then securely attached to scope 16 by slidably adjusting second clamp element 40 to securely grip barrel 54 of scope 16 within concave recesses 50 and 52. Second clamp element 40 is then secured in fixed position by threaded fastener 46 securing element 40 to extension portion 42 of bracket 18. Bracket stop pin 58 is rotated to retentively engage barrel 54 to prevent angular movement of camera 12. Cable release mounting bracket 26 is securely attached to trigger guard 28 by means of threaded fasteners 70 of plate 62 engaging threaded bores 76 of plate element 64. Trigger guard 28 is received within convex recesses 66 and 68 and securely sandwiched between plate elements 62 and 64 for secure attachment of cable release mounting bracket 26 to trigger guard 28. Thus attached, actuation button 32 is in the vicinity of trigger 30 to allow coordination or synchronization of trigger 30 and button 32. The location of button 32 allows the operator to actuate the camera prior to pulling the trigger, contemporaneous with pulling the trigger, or subsequent to pulling the trigger simply by the relative positioning of the trigger finger.

As can be seen, camera mounting device 10 quickly and easily attaches to a conventional rifle and scope without modification, disfigurement, or damage to the existing equipment. The device also allows utilization of a conventional, common camera. Thus, no specialized equipment in the nature of camera, scope or rifle is required. The camera can be utilized exclusive of this invention for normal photography endeavors and likewise the rifle and scope.

Camera mounting device 10 allows a hunting enthusiast to simulate hunting through photography without actually shooting an animal. It allows the hunter to experience many of the aspects of hunting without inflicting injury on the animal. Because it is not necessary to actually fire the gun, it can be utilized irrespective of the hunting season. The device can be utilized with blank cartridges if one desires to photograph the animal after the explosive sound. For hunters, they are able to photographically record the animal prior to, or subsequent to, the shot.

Although the mounting of camera 12 upon scope 16 provides acceptable alignment for photography purposes, it is also possible to obtain more accurate alignment and utilize a cross-hair attachment on the camera to simulate and record accuracy of the photographic shot.

As can be seen, the camera mounting device is of rugged construction which is needed for outdoor hunting and allows quick and easy attachment and detachment.

Thus, it can be seen that this device accomplishes at least all of its stated objectives.

What I claim is:

1. A camera mounting device comprising,
a first mounting bracket adapted to support a camera,
means for detachably securing a camera to said first mounting bracket,
means for detachably securing said first mounting bracket to the telescopic scope of a rifle,
a cable release means adapted for connection to a camera and having an actuation member,
a second mounting bracket for connection to said cable release means,
means for connecting said cable release means to said second mounting bracket and
means for detachably securing said second mounting bracket to a rifle.

2. A camera mounting device comprising,
a first mounting bracket adapted to support a camera,
means for detachably securing a camera to said first mounting bracket,
a variable diameter clamp means for clamping engagement to the barrel of a telescopic rifle scope, said clamp means being attached to said first mounting bracket,
a cable release means adapted for connection to a camera and having an actuation member,
a second mounting bracket for connection to said cable release means,
means for connecting said cable release means to said second mounting bracket, and
means for detachably securing said second mounting bracket to a rifle.

3. The device of claim 2 wherein,
said clamp means comprises a first clamp element having a concave recess adapted to receive the barrel of a telescopic rifle scope, said first clamp element being securely attached to said first mounting bracket,
a second clamp element having a concave recess adapted to receive the barrel of a telescopic rifle scope, said second clamp element being selectively, adjustably mounted to said first mounting bracket in spaced apart relation to said first clamp element.

4. The device of claim 3 wherein,
said first mounting bracket has an elongated slot therethrough,
said second clamp element has a threaded aperture, and
a threaded fastener extends through said elongated slot into engagement with said aperture to secure said second clamp element to said first mounting bracket.

5. The device of claim 1 wherein said means for connecting said cable release means to said second mounting bracket comprises,
said second mounting bracket having a bore therethrough with a seat portion, and
said cable release means having first and second ends, said first end being adapted for connection to a camera and said second end having said actuation member and a flange member with said cable release means extending through said bore and said flange member retentively contained within said seat portion.

6. The device of claim 1 wherein, said means for detachably securing said second mounting bracket to a rifle comprises means for detachable securement to the trigger guard of a rifle.

7. The device of claim 6 wherein, said actuation member is positioned adjacent the trigger of a rifle when said second mounting bracket is secured to the trigger guard.

8. A camera mounting device comprising, a first mounting bracket adapted to support a camera, means for detachably securing a camera to said first mounting bracket, means for detachably securing said first mounting bracket to the telescopic scope of a rifle, a cable release means adapted for connection to a camera and having an actuation member, a second mounting bracket for connection to said cable release means, said second mounting bracket having a first plate, a second plate, and fastener means to connect said first plate to said second plate with the trigger guard of a rifle securely disposed between said first and second plate, means for connecting said cable release means to said second mounting bracket, and means for detachably securing said second mounting bracket to a rifle.

9. The device of claim 8 wherein, said first plate has a concave flanged portion for reception of the trigger guard of a rifle, and said second plate has a concave flanged portion for reception of the trigger guard of a rifle.

10. The device of claim 9 wherein, said second plate has a bore therethrough with a seat portion, said cable release means has first and second ends, said first end being adapted for connection to a camera and said second end having said actuation member and a flange member with said cable release means extending through said bore and said flange member retentively contained within said seat portion so that said actuation member is adjacent the trigger of a rifle when said second mounting bracket is secured to the trigger guard of a rifle.

* * * * *